Oct. 3, 1939.  T. A. McGREGOR  2,174,636

ADJUSTABLE SUPPORT AND LOCKING MECHANISM

Filed June 8, 1936  2 Sheets-Sheet 1

INVENTOR
THOMAS A. McGREGOR
BY
ATTORNEYS

Oct. 3, 1939.   T. A. McGREGOR   2,174,636
ADJUSTABLE SUPPORT AND LOCKING MECHANISM
Filed June 8, 1936   2 Sheets-Sheet 2
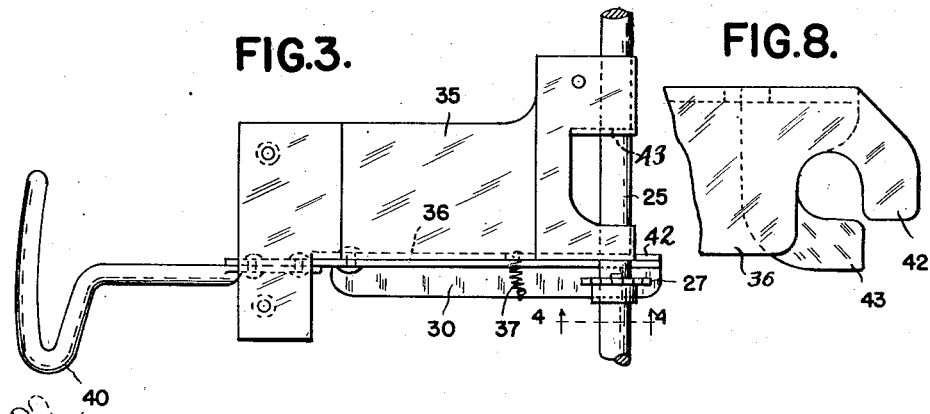
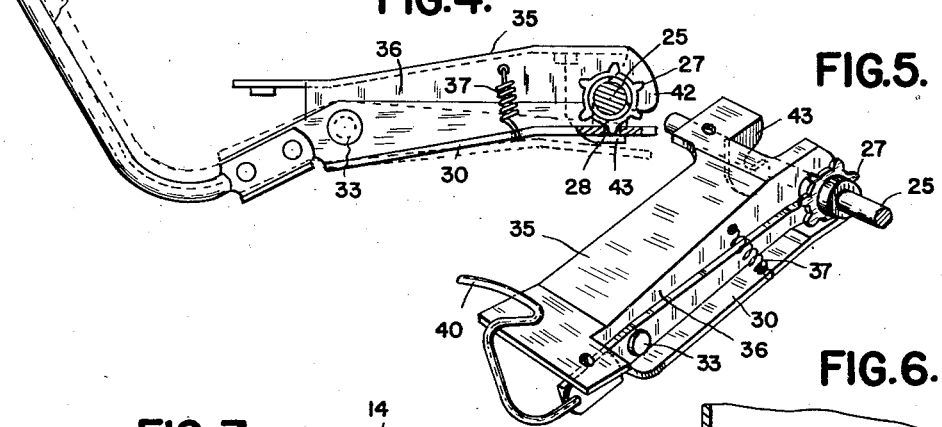
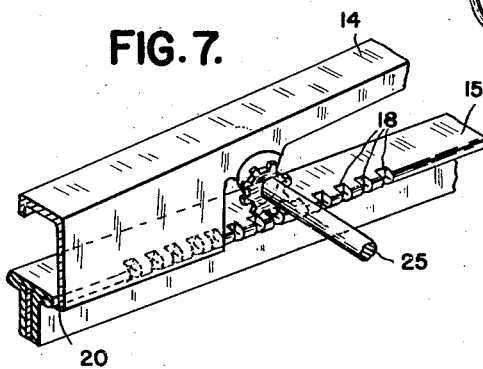
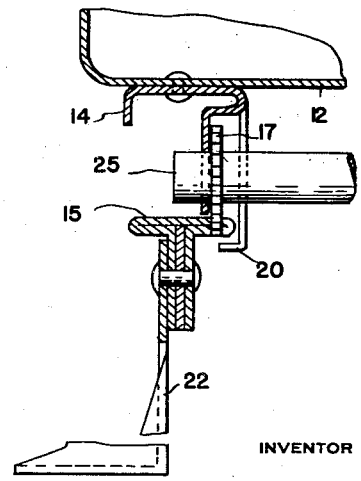
INVENTOR
THOMAS A. McGREGOR
BY
ATTORNEYS Patented Oct. 3, 1939

2,174,636

UNITED STATES PATENT OFFICE 2,174,636

ADJUSTABLE SUPPORT AND LOCKING MECHANISM

Thomas A. McGregor, Pontiac, Mich., assignor to American Forging & Socket Company, Pontiac, Mich.

Application June 8, 1936, Serial No. 84,144

3 Claims. (Cl. 155—14)

The present invention relates to adjustable supporting mechanisms for seats and the like, and is particularly directed to improvement of the controlling means by which slidably adjustable vehicle seats may be held against and freed for movement by their occupants.

As commonly constructed, such seat supporting mechanisms include a rail or track near each end of the seat, over which tracks ride carriage elements upon which the seat is supported. Usually anti-friction means is interposed between the carriages and tracks consisting of wheels or rollers. In a popular construction with which this invention is especially adapted to cooperate, the wheels, journaled in the carriage elements, are toothed and mesh with racks carried by the tracks. To guard against any slight turning of the seat which looseness of the mechanism might allow, and the jamming or wedging of the parts which is apt to result unless such cocking is prevented, the toothed wheels of the opposed carriages are in the construction in question tied by a cross shaft, which forces the wheels, and accordingly the carriages, to move together, insuring parallel and uniform movement of both ends of the seat. The cross shaft of course acts entirely in torsion, and need not be and commonly is not made strong enough to resist lateral deflection under substantial side stress. The present invention aims to provide locking means for cooperation with the cross shaft to releasably hold the seat in desired positions of adjustment, which locking means is installable after the attachment of the slidable supporting mechanism to the seat, and serves as well to provide bearing means for the central portion of the shaft adapted to prevent undesired deflection thereof, and relieve the strain which the locking means would otherwise impose thereupon.

Another object consists in the provision of locking means of the character indicated which is simply constructed of sheet metal and other inexpensive parts, may be located centrally with respect to the seat, and is conveniently operable by straight up and down movement of the handle.

Other objects and advantages will be apparent from the following description, wherein reference is made to the accompanying drawings illustrating a preferred embodiment of my invention and wherein similar reference numerals designate similar parts throughout the several views.

In the drawings:

Figure 3 is a plan view of the locking mechanism;

Figure 4 is a side view thereof, corresponding to a section taken through the cross shaft, substantially on the line 4—4 of Figure 3, and looking in the direction of the arrows;

Figure 5 is a perspective view of the locking mechanism and adjacent parts of the cross shaft;

Figure 6 is a cross section of the seat support, taken substantially on the line 6—6 of Figure 2, and looking in the direction of the arrows;

Figure 7 is a fragmentary perspective view of the seat support, and

Figure 8 is a fragmentary side elevational view of the shaft-engaging portions of the locking mechanism frame.

Figure 1:
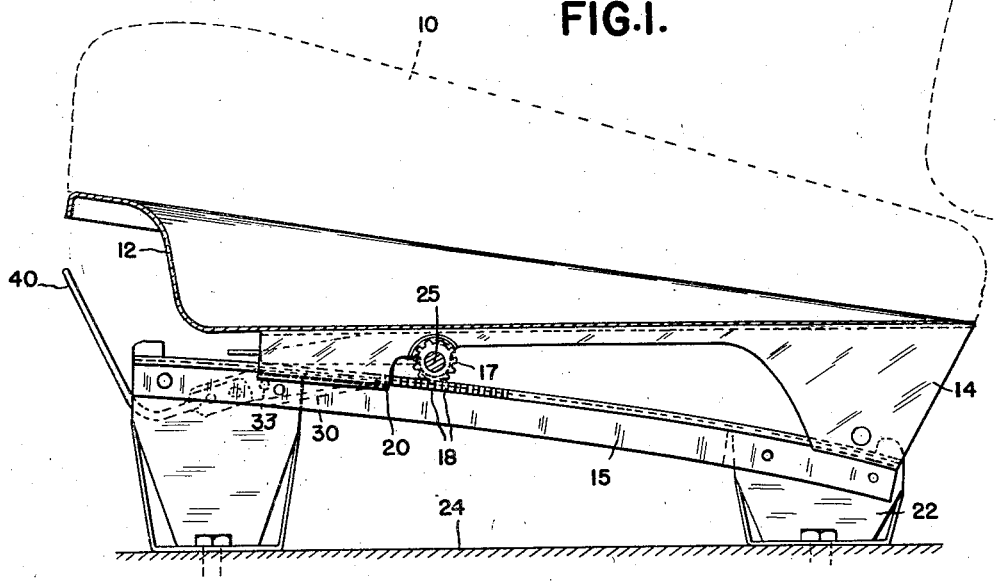
Figure 1 is a vertical cross section of the seat supporting means, taken substantially as indicated by the line 1—1 of Figure 2 and looking in the direction of the arrows, the relative positioning of the seat and of the operating handle for the locking means being indicated in dotted lines.
Figure 2:
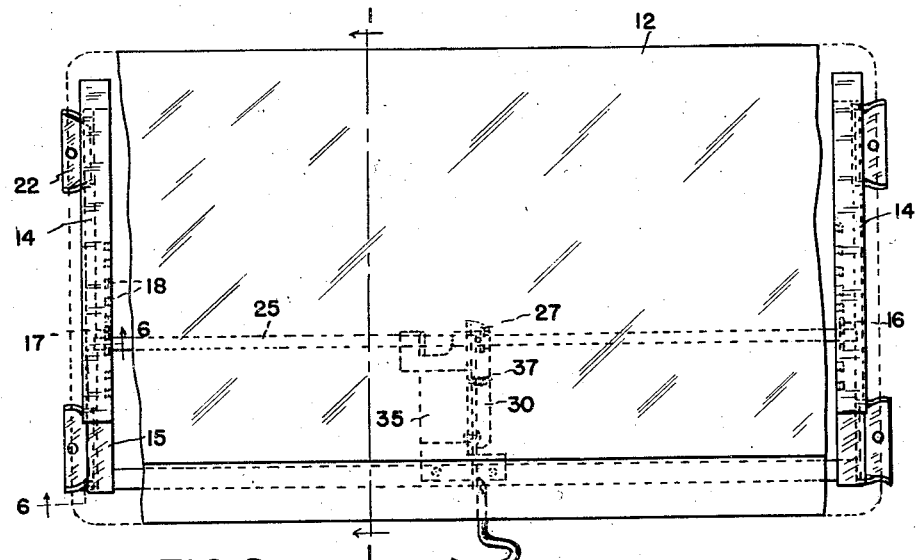
Figure 2 is a plan view of a seat carried by such supporting means and provided with locking means constructed in accordance with the present invention, parts of the seat being broken away.

Referring now to the drawings, it will be seen that the seat 10 is indicated as carried upon a pressed sheet metal base 12, although the particular construction of such framework will be recognized to be immaterial insofar as the present invention is concerned.

Secured to and beneath the seat base 12, one near each end, are carriage members 14 adapted to travel over tracks 15 upon anti-friction guide wheels 16—17. The wheels will be seen to be journaled in the carriage frame and to engage in the serially arranged openings 18 in the track which openings form racks for the purpose. The track is somewhat arched, and such curvature acts to tilt the seat forwardly as it is moved in that direction, and vice versa. Holding flanges 20 carried by the carriage underhang the track flanges to prevent separation of the seat and track. The track is shown elevated from the floor 24 upon legs 22. Between the front toothed wheels 17 of the opposite carriages extends a cross shaft 25, fixed to one of such wheels at each end, and accordingly acting to insure like movement of both ends of the seat. The cross shaft 25 will be seen to be journaled in the carriages and to extend directly beneath and travel with the seat in its movement over the tracks.

Advantage is taken of the geared connection between the seat frame, shaft and tracks to hold the shaft against turning when it is desired to latch the seat in position. For this purpose the shaft 25 is centrally provided with a third toothed wheel 27, also fast thereupon, and a pawl or detent 30 is movable into and out of engagement with the toothed edge of the wheel, and so formed that when engaged it completely encircles one tooth and so holds the shaft against rotation in either direction. The pawl is pivoted for vertical swinging movement about an axis parallel to that of the shaft 25, provided by a pivot pin 33 by which it is mounted in the frame 35, secured to the bottom of the seat near the front thereof. A handle 40 secured to the pawl may extend forward and upwardly therefrom to a position in which it may be conveniently reached and manipulated by an occupant of the seat, and is indicated as comprising a heavy wire bent to provide a hand grip and at its lower end flattened and riveted to the pawl. The pawl is indicated as of right-angular form, having an upright flange 36 lying alongside the vertical web of the frame 35, to which web it is pivoted, and a horizontal flange apertured as at 28 to receive whichever tooth of wheel 27 is aligned therewith. A tensile spring 37 urges the pawl toward engaged position.

To positively align the pawl opening 28 with respect to the toothed wheel, and to prevent deflection of shaft 25 which might interfere with such alignment and proper holding of the locking mechanism, hooked bearing portions 42—43 carried by the rear extremity of the frame 35 engage shaft 25, each extending only part way thereabout, but their total extent approximating 360 degrees, and so forming in effect a complete bearing, adapted to prevent flexure of the shaft in any direction. The hooked bearing portions comprise semi-circular openings arranged perpendicularly to each other, hooked portion 43 opening rearwardly, and hooked portion 42 downwardly. These hooked portions will be seen to be spaced from each other, and portion 42 carried by web of the latch frame.

When the carriage members are secured to the under side of the seat the shaft is thereby permanently journaled beneath and parallel to the seat. The latch frame may be installed after the shaft is in position. The hook 42 is first engaged over the central portion of shaft 25, by bowing the latter downwardly sufficiently to pass the hook thereover, after which the frame may be turned about a vertical axis to move the hook 43 rearwardly into engagement with the shaft, whereafter the frame may be riveted or otherwise fastened directly to the seat base, providing a rigid journal for the central portion of the cross shaft and holding it and the pawl in proper alignment to insure registry of the latter with the teeth of wheel 27.

While it will be apparent that the illustrated embodiment of my invention herein disclosed is well calculated to adequately fulfill the objects and advantages primarily stated, it is to be understood that the invention is susceptible to variation, modification and change within the spirit and scope of the subjoined claims.

What I claim is:

1. Adjustable supporting means for a seat or the like including a pair of carriage members adapted to be spacedly secured to a supported object, tracks for supporting said carriage members, opposed gear members having portions intermeshing with said tracks for controlling the relative movement of the carriage members, at least one of said gear members being connected to each carriage member, a cross shaft connecting said gear members and forcing the same and accordingly both carriage members to move together, said shaft being relatively flexible laterally under bending stresses and relatively resistant to torsional stresses, and means for releasably holding the supported object against undesired movement, comprising a toothed portion carried by a central portion of the shaft, a detent frame adapted to be secured to the supported object adjacent said shaft and said toothed portion, a detent carried by said detent frame and movable into and from engagement with said toothed portion, and a hooked bearing portion carried by said detent frame and engaging the shaft to prevent undesired lateral flexure of the shaft and maintain the same and the toothed portion in desired alignment with the detent, said hooked bearing portion being adapted to extend through the space between the shaft and the supported object during installation of the detent frame, said portion having a part wider than the shortest distance between the shaft and supported object, whereby it is insertable therebetween only by flexing the shaft away from the supported object, and another hooked bearing portion carried by said detent frame and engageable with an opposite portion of the shaft to prevent flexure of the shaft away from the supported object.

2. Adjustable supporting means for a seat or the like including a pair of carriage members adapted to be spacedly secured to a supported object, tracks for supporting said carriage members, opposed gears having portions inter-meshing with the tracks for controlling the relative movement of the carriage members, at least one of said gears being mounted in and movably supporting each carriage member, a cross shaft connecting said roller members and forcing the same and accordingly both carriage members to move together, means for releasably holding the supported object against undesired movement comprising a toothed portion carried by the shaft, detent means including a detent frame adapted to be affixed to the supported object, a dogging element carried by said detent frame and movable into and out of engagement with said toothed portion, and hooked bearing portions fixedly carried by said detent frame in spaced relation to each other, opening in relatively angular directions and engaging the shaft in angular relation to each other, whereby they act to hold the shaft against undesired lateral deflection in different directions.

3. Apparatus as set forth in claim 2 in which one of said hooked bearing portions is adjacent the dogging element and engage the shaft on a side opposite to that upon which said dogging element engages the toothed portion, but not upon such side engaged by the dogging element.

THOMAS A. McGREGOR.